A. KIMBLE.
WATER COOLED PULLEY.
APPLICATION FILED OCT. 27, 1921.
1,437,595. Patented Dec. 5, 1922.
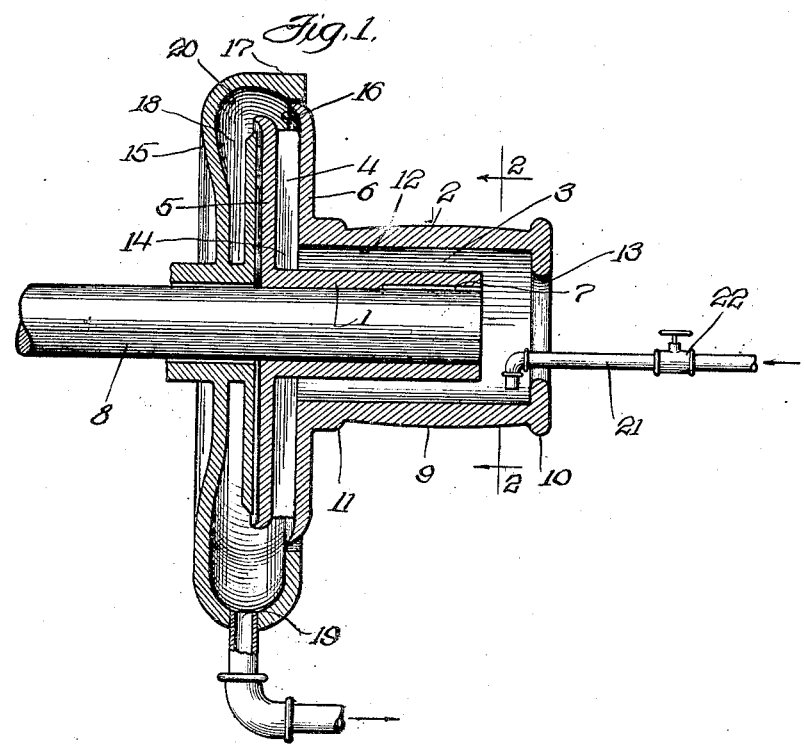
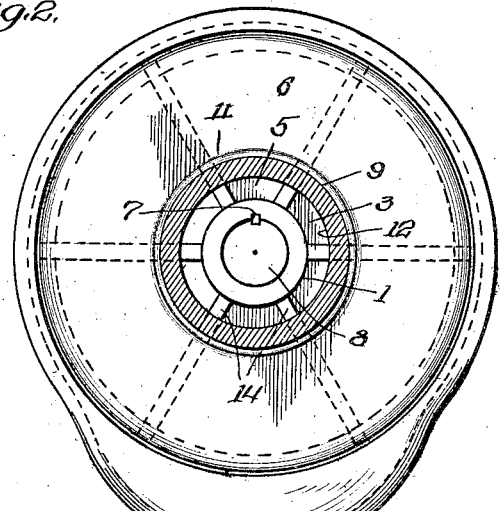

Patented Dec. 5, 1922.

1,437,595

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

WATER-COOLED PULLEY.

Application filed October 27, 1921. Serial No. 510,913.

*To all whom it may concern:*

Be it known that I, AUSTIN KIMBLE, a citizen of the United States of America, and a resident of Wausau, county of Marathon, and State of Wisconsin, have invented certain new and useful Improvements in Water-Cooled Pulleys, of which the following is a specification.

The main objects of this invention are to provide a water-cooled power-transmission element for use in apparatus where the speed of or the torque to the driven member is controlled by the relative slipping of said element and a part coacting therewith to transmit power; to provide an improved construction and arrangement of said element for obtaining a flow of water therethrough for the purpose of dissipating the heat created by the relative slipping of the element and part; to provide improved means for receiving and conveying away from said element the water discharged therefrom; and to provide a water cooled element of this kind in the form of a pulley adapted for use with belt transmission.

An illustrative embodiment of this invention is shown in the accompanying drawing, in which Figure 1 is a sectional elevation of a water-cooled pulley constructed in accordance with this invention.

Figure 2 is an end view of the same partly sectional, the view being taken on the plane of the line 2—2 of Fig. 1.

A power transmission element embodying this invention involves the use of an annular passage extending inwardly from one end of the element and communicating with a radially disposed passage of discoidal shape formed at the other end, said passages being so arranged that during the rotation of the element water received at one end of the annular passage moves inwardly therealong to the radial passage from which it is discharged centrifugally into a casing providing a chamber surrounding the periphery of said discoidal-shaped passage from which chamber leads a suitable outlet. Such an element is particularly suitable for use in power transmission where power from the driving member is transmitted to the driven member through parts having frictional contact with each other and where it is desired to control the speed of the driven member or the torque delivered thereto by the relative slipping of such parts.

In the specific embodiment herein shown the power transmission element is in the form of a pulley having a hub 1 and a belt rim 2 coaxially arranged but spaced apart radially so as to provide an annular chamber 3 extending inwardly from one end of the pulley and communicating with a radially disposed passage 4 of discoidal shape formed between the flanges 5 and 6 spaced apart axially and secured to said hub and rim respectively at the other end of said pulley.

The hub 1 is provided with the usual keyway 7 by which the pulley may be secured to a suitable shaft 8. The belt rim 2 is shaped to provide the usual crowned belt surface 9 between the rims 10 and 11. The peripheral wall 12 of the annular passage 3 is of gradually enlarging diameter as it extends inwardly toward the passage 4. The one end of the pulley is provided with an annual rim 13 which prevents water from running out from that end of the passage 3.

Vanes 14 are arranged between the flanges 5 and 6 so as to coact therewith in the formation of a fan which, during the rotation of the pulley, causes the water drawn in through the passage 3 to be dispersed centrifugally outward through the discoidal-shaped passage 4 and discharged into a surrounding casing 15. The peripheral ends of the flanges 5 and 6 are curved over as indicated at 16 so that the water is discharged from the passage 4 in a somewhat axial direction. The hub, vanes and pulley rim may be formed integrally and are preferably die cast in a single unit.

The casing 15, as herein shown, is of annular shape and has a rim 17 surrounding the periphery of the flanges 5 and 6 and the discoidal-shaped passage 4, and provides a chamber 18 into which the water is discharged from the passage 4. At the base the casing 15 is shaped so as to provide an offset or pocket 23 into which the water flows and is conducted away through an outlet 19. The outer wall 20 of the chamber 18 is curved so as to provide a sort of continuation of the curved ends 16 of the flanges 5 and 6 whereby the water is directed toward the axis of the casing with as little splashing as possible.

A water inlet pipe 21 extends into the passage 3, the supply of water being controlled by a valve 22.

When a pulley of this kind is used with power transmission apparatus, the shaft 8 which carries the pulley, is usually that to which the power is applied and suitable means are provided for tensioning the belt so that it has a predetermined frictional contact with the pulley surface 9 whereby a predetermined portion of the power of the driving member is transmitted through the belt to the driven member. The amount of relative slipping of the pulley and belt depends of course upon the tension of the belt which may be varied by the shifting of the tensioning means.

As the pulley rotates the water admitted through the pipe 21 is, by centrifugal force, caused to form a film over the entire area of the surface 12. This surface being tapered as indicated insures the water traveling inwardly toward the passage 4 where it is received by the vanes and thrown centrifugally outward into the chamber 18 from whence it runs out through the outlet 19. Water thus moving through the passages 3 and 4 dissipates the heat created by the relative slipping of the belt and pulley.

When the pulley is at a stand-still, water entering through the pipe 21 merely runs along the bottom of the passage 3 down through the passage 4 into the bottom of the chamber 18, and out through the outlet 19.

Although but one specific embodiment of this invention has been herein shown and described, it will be understood that numerous details of the construction shown may be altered or omitted without departing from the spirit of this invention as defined by the following claims.

I claim:

1. A pulley having a belt rim arranged for the circulation of a liquid cooling medium in contact with the inner surface of said rim, and radially vaned oulet means on said rim adapted to receive the cooling medium from said inner surface and disperse the same centrifugally.

2. A pulley having a belt rim arranged for the circulation of a liquid cooling medium in contact with its inner surface, said rim having an inwardly projecting flange near one end, and means at the other end of said rim for dispersing the liquid centrifugally.

3. A pulley comprising a belt rim having an inwardly projecting flange near one end, means for admitting a liquid behind said flange for circulation in contact with the inner surface of said rim, and means at the other end of said rim for receiving the liquid from said inner surface and dispersing the same centrifugally.

4. A rotatable power-transmission element comprising a supporting hub, a coaxially arranged part providing a friction driving surface, said part having an annular passage extending inwardly from one end arranged to have water admitted thereto, and means at the other end providing a radially disposed passage communicating with said annular passage and adapted to receive water therefrom and disperse the same centrifugally.

5. A rotatable power-transmission element comprising a supporting hub, a coaxially arranged part providing a friction driving surface, said part having an annular passage extending inwardly from one end arranged to have water admitted thereto, means at the other end providing a radially disposed passage communicating with said annular passage and adapted to receive water therefrom and disperse the same centrifugally, and other means adapted to receive the water discharged from said radial passage.

6. A rotatable power-transmission element comprising a supporting hub, a coaxially arranged part providing a friction driving surface, said part having an annular passage extending inwardly from one end arranged to have water admitted thereto, said annular passage having a gradually enlarging diameter as it extends inwardly from said one end, and means at the other end providing a radially disposed passage communicating with said annular passage and adapted to receive water therefrom and disperse the same centrifugally.

7. A rotatable power-transmission element comprising a supporting hub, a coaxially arranged part providing a friction driving surface, said part having an annular passage extending inwardly from one end arranged to have water admitted thereto, means at the other end providing a radially disposed passage communicating with said annular passage and adapted to receive water therefrom and disperse the same centrifugally, and a casing having an annular chamber surrounding the periphery and communicating with said radially disposed passage to receive the water centrifugally discharged therefrom.

8. A pulley for use with belt transmission apparatus, comprising a hub, a belt rim radially spaced from said hub so as to provide an annular passage extending radially inward from one end and arranged to have water admitted thereto, axially-disposed flanges on said hub and rim respectively at the other end of said pulley, said flanges providing a discoidal-shaped passage communicating with said annular passage and adapted to receive water therefrom to be dispersed centrifugally, and means adapted to receive the water discharged from said discoidal-shaped passage.

9. A pulley for use with belt transmission apparatus, comprising a hub, a belt rim radially spaced from said hub so as to provide an annular passage extending radially inward from one end and arranged to have water admitted thereto, axially-disposed flanges on said hub and rim respectively at the other end of said pulley, said flanges providing a discoidal-shaped passage communicating with said annular passage and adapted to receive water therefrom to be dispersed centrifugally, a casing surrounding the periphery of said flanges and said discoidal-shaped passage and having a chamber adapted to receive water discharged from said discoidal-shaped passage, and a discharge outlet for said chamber.

10. A pulley for use with belt transmission apparatus, comprising a hub, a belt rim radially spaced from said hub so as to provide an annular passage extending radially inward from one end and arranged to have water admitted thereto, said annular passage having a gradually enlarging diameter as it extends inwardly from said one end, axially-disposed flanges on said hub and rim respectively at the other end of said pulley, said flanges providing a discoidal-shaped passage communicating with said annular passage and adapted to receive water therefrom to be dispersed centrifugally, and means adapted to receive the water discharged from said discoidal-shaped passage.

11. A pulley for use with belt transmission apparatus, comprising a hub, a belt rim radially spaced from said hub so as to provide an annular passage extending radially inward from one end and arranged to have water admitted thereto, axially-disposed flanges on said hub and rim respectively at the other end of said pulley, said flanges providing a discoidal-shaped passage communicating with said annular passage and adapted to receive water therefrom to be dispersed centrifugally, said flanges having the peripheral edge thereof curved away from said one end of the casing, a casing surrounding the periphery of said flanges and discoidal-shaped passage and having a chamber adapted to receive the water discharged from said discoidal-shaped passage, the wall of said chamber adjacent to the periphery of said discoidal-shaped passage being substantially a continuation of the curvature of said flanged ends, and a discharge outlet for said chamber.

Signed at Chicago this 18th day of October, 1921.

AUSTIN KIMBLE.